United States Patent [19]

Larson

[11] 3,862,432

[45] Jan. 21, 1975

[54] TOUCH ACTUATED ELECTRONIC SWITCH

[75] Inventor: Willis A. Larson, Waybata, Minn.

[73] Assignee: Magic Dot, Inc., Minneapolis, Minn.

[22] Filed: Mar. 12, 1973

[21] Appl. No.: 340,183

Related U.S. Application Data

[63] Continuation of Ser. No. 235,671, March 17, 1972.

[52] U.S. Cl. .................. 307/116, 307/308, 307/315, 317/DIG. 2

[51] Int. Cl. .................. H01h 35/00

[58] Field of Search ....... 317/DIG. 2; 307/116, 308, 307/315; 340/365 R, 365 C

[56] References Cited

UNITED STATES PATENTS

| | | | |
|---|---|---|---|
| 2,848,659 | 8/1958 | Cutler | 317/DIG. 2 |
| 3,080,509 | 3/1963 | Rowe | 317/DIG. 2 |
| 3,144,592 | 8/1964 | Leeds et al. | 317/DIG. 2 |
| 3,303,397 | 2/1967 | Myers | 317/DIG. 2 |
| 3,492,440 | 1/1970 | Gerbone et al. | 317/DIG. 2 |
| 3,555,368 | 1/1971 | Atkins | 317/DIG. 2 |
| 3,668,660 | 6/1972 | Watten | 340/365 R |
| 3,679,910 | 7/1972 | Williams | 307/308 |
| 3,766,404 | 10/1973 | Larson et al. | 317/DIG. 2 |
| 3,787,732 | 1/1974 | Larson | 317/DIG. 2 |

*Primary Examiner*—L. T. Hix
*Attorney, Agent, or Firm*—Wicks & Nemer

[57] ABSTRACT

An electronic switch which has no moving parts and is actuated by the capacitance of an operator providing a reference between the isolated electronics associated with the switch and earth ground is disclosed. The electronic switch in the preferred embodiment, includes a plate accessible to the touch of a human operator electrically connected to the input of a first amplifier isolated from earth ground. The output of the first amplifier is simultaneously connected to one end of a storage capacitor, having its other end connected to the circuit reference, and to one end of a high impedance, both also isolated from earth ground. A second amplifier, also isolated from earth ground, is connected to the other end of the high impedance to provide a switched output, with the switched output having a first state for approximately an electrical short circuit and a second state for approximating an electrical open circuit. Also, alternate embodiments of the switch of the present invention are shown including arrangements and techniques for increasing noise immunity and increasing reliability of operation in general.

18 Claims, 5 Drawing Figures

PATENTED JAN 21 1975 3.862,432

TOUCH ACTUATED ELECTRONIC SWITCH

CROSS REFERENCE

This is a continuation of application Ser. No. 235,671, filed Mar. 17, 1972.

BACKGROUND

This invention relates generally to electronic switching and more specifically to a touch actuated electronic switch which has no moving parts and is actuated by the capacitance of an operator providing a reference between electronics isolated from earth ground and earth ground itself.

In the past, various approaches have been suggested to provide switches actuated by the capacitance of a human touching or approaching a portion of the electronics of the switch. Past approaches have suffered from certain drawbacks, however, including low noise suppression or immunity, high cost, large size, difficult fabrication, unreliable actuation once touched or approached, premature actuation before touched or approached, and a general questionable or poor reliability of performance.

SUMMARY

The present invention provides an electronic switch which solves these and other problems by providing, in the preferred embodiment, an electronic switch including a series connection of a touch plate, first amplifier, high impedance, and second amplifier, all electrically isolated from earth ground in a manner to cause the entire switching circuit to oscillate with respect to earth ground at a power frequency. A storage device, in the preferred embodiment shown as a capacitor, is connected between the junction of the first amplifier and the high impedance and extends to the reference point of the switching circuit. The arrangement of the switching circuit is such that an input to the first amplifier is provided by operator's touch of the touch plate, the input is amplified and rectified in the first amplifier, the output of the first amplifier charges the capacitor, and the charge of the capacitor is conducted through the high impedance into the second amplifier where it controls the output of the secomd amplifier between a first state for approximating an electrical short circuit and a second state for approximating an electrical open circuit.

Additional embodiments are shown where increased noise immunity or increased noise suppression may be had by the connection of a high impedance between the switching circuit and earth ground.

Further, additional embodiments are shown where increased reliability may be had by enhancing the amplitude of the oscillation of the switching circuit with respect to earth ground and by correctly phasing such oscillation with respect to earth ground.

It is thus an object of the present invention to provide a novel touch actuated electronic switch.

It is a further object of the present invention to provide such an electronic switch where the electronics associated with the switch are isolated and oscillate with respect to earth ground, and the capacitance of a human operator touching the switch provides for actuation.

It is a further object of the present invention to provide an electronic switch which is inexpensive to fabricate and of a small size.

It is a further object of the present invention to provide such a switch which is reliable.

It is a further object of the present invention to provide such a switch with high noise immunity.

It is a further object of the present invention to provide such a switch which is easily fabricated.

These and further objects and advantages of the present invention will become clearer in the light of the following detailed description of the illustrative embodiments of this invention described in connection with the drawings.

DESCRIPTION

Figure 1:
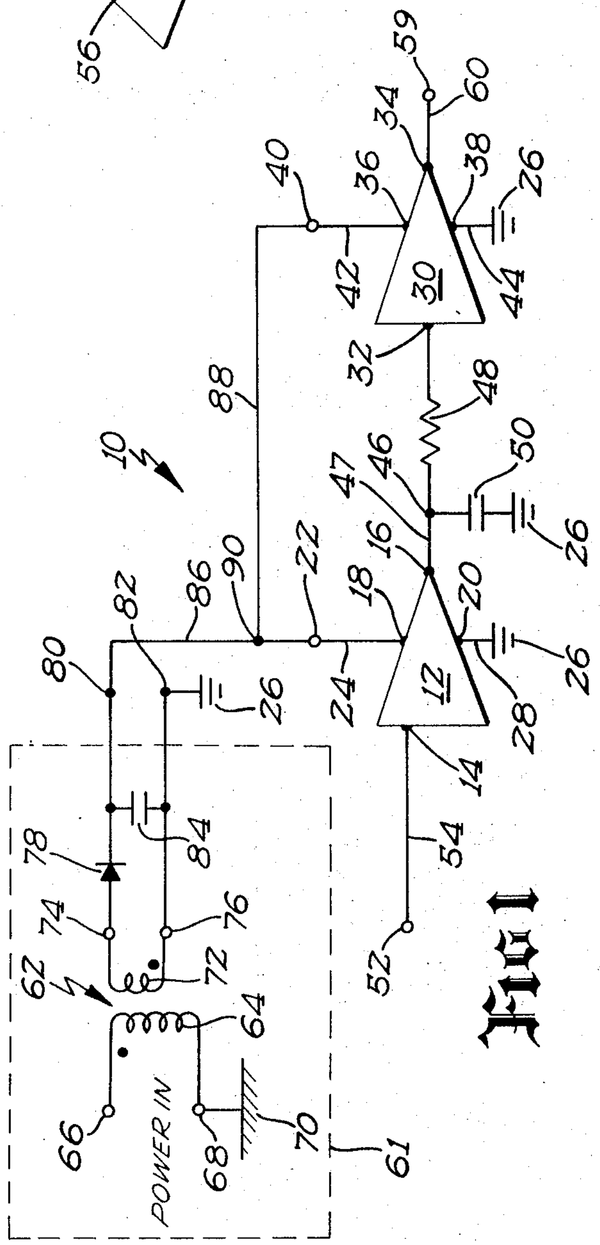
FIG. 1 shows a schematic diagram of electronics which can be used with the electronic switch of the present invention.

In FIG. 1, the electronic switching circuitry of the switch of the present invention is generally designated 10. This electronic circuitry includes a D.C. to power frequency amplifier 12, including a signal input 14, a signal output 16, a power input 18, and a reference or circuit ground input 20. It is of course well known that used power frequencies are substantially 40 to 400 Hertz. Power input 18 is connected to a power terminal 22 by a wire 24 and circuit ground input 20 is connected to a circuit ground or reference generally designated 26 by a wire 28.

The electronic circuitry further includes a second D.C. to power frequency amplifier 30 including a signal input 32, a signal output 34, a power input 36, and a reference or circuit ground input 38. Power input 36 is connected to a power terminal 40 by a wire 42 and circuit ground input 38 is connected to circuit ground 26 by a wire 44.

Output 16 of amplifier 12 is connected to a junction point 46 by a wire 47. Junction point 46 is further connected to input 32 of second amplifier 30 through a high value of impedance or resistance such as resistor 48. Junction point 46 is further connected to circuit ground 26 through a storage, integrating, or smoothing element shown as capacitor 50.

Figure 2:
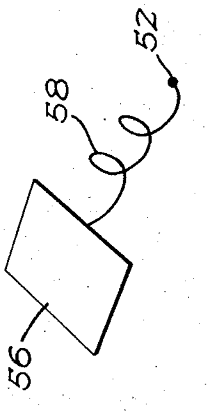
FIG. 2 shows a touch plate for use with the electronic switch of the present invention.

Input 14 to amplifier 12 of the switching circuit 10 is shown as connected to switching circuit input terminal 52 through a connection 54. Switching circuit terminal input 52 is further connected to a touch plate 56, as shown in FIG. 2, by a wire 58. Touch plate 56 is a metal plate or other conductive material which may be an actual plate, spot of a conductive material, or in the extreme case, the end of a wire.

Signal output 34 of amplifier 30 is connected to output terminal 59 of circuitry 10 by a wire 60. The electrical impedance or resistance between output terminal 59 and circuit ground 26 is then arranged in a manner hereinafter explained to approximate an electrical short circuit in a first state and an electrical open circuit in a second state, the state depending upon whether the operator's finger is touching or not touching touch plate 56.

A power supply for the switching circuit 10 of the present invention is generally designated 61. Power supply 61 of FIG. 1 includes a transformer generally designated 62 having a primary winding 64. Primary winding 64 includes transformer primary winding terminals 66 and 68 shown as connected to a source of alternating frequency power labeled "power in." Primary terminal 68 is shown as connected to earth ground, generally designated 70. Transformer 62 further includes a secondary winding 72 which includes secondary winding terminals 74 and 76.

Transformer 62 is arranged such that secondary 72 is isolated from primary 64 and thus from earth ground. As used herein, earth ground designates the ultimate grounding reference available, i.e., the earth, and should be distinguished for the purposes of this application from the designation "circuit ground" which, as used herein, is the reference or ground point within switching circuitry 10. As generally used herein, circuit ground 26 is to be considered as isolated from earth ground 70, or, in the case of further embodiments, is to be connected in a controlled fashion to be explained hereinafter.

Thus, secondary terminal 76 is connected to circuit ground 26, while secondary terminal 74 is connected by a diode 78 to one power supply terminal 80. The other power supply terminal 82 is connected to circuit ground 26 and thus to the other secondary terminal 76. A filter capacitor 84 is conventionally connected between power supply terminals 80 and 82.

Power supply terminal 80 is further connected to switching circuit 10 and in particular to power supply terminal 22 of the first amplifier 12 by a wire 86. Power supply terminal 80 is further connected to second amplifier 30 by a wire 88 joining wire 86 at junction point 90.

Figure 3:
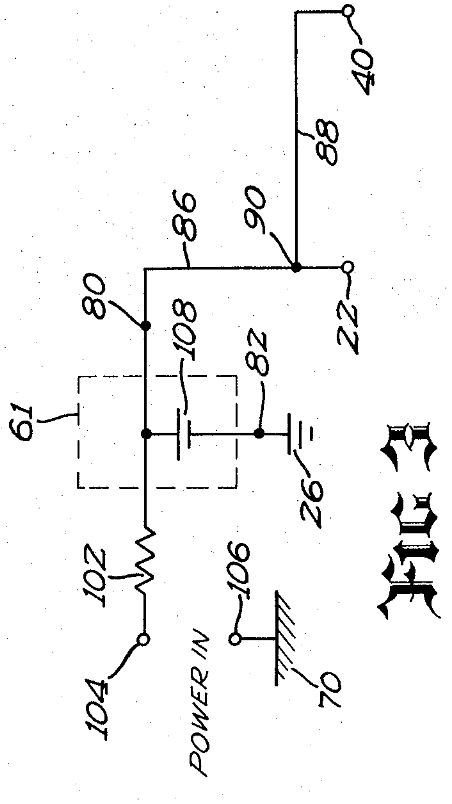
FIGS. 3 and 4 show alternate embodiments of power supplies which may be used with the circuitry of FIG. 1.

FIG. 3 shows an alternative embodiment of power supply 61 including an enhancement resistor 102 connected between power supply terminal 80 and one terminal 104 connected to a source of alternating frequency power arranged between terminal 104 and a further terminal 106. Terminal 106 is further connected to earth ground 70. The basic element of power supply 61 as shown in FIG. 3 is a battery designated 108 which is connected between power supply terminals 80 and 82.

Figure 4:
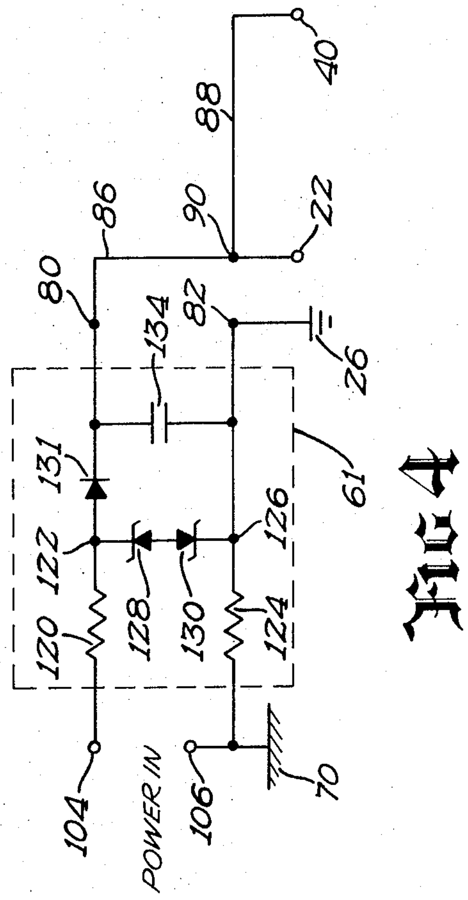

FIG. 4 shows a further alternate embodiment of power supply 61 which may be used in place of power supply 61 shown in FIG. 1. In FIG. 4, a resistor 120 is connected between alternating frequency terminal 104 and a junction point 122, and a resistor 124 is connected between alternating frequency terminal 106 and a junction point 126. Back to back zener diodes 128 and 130 are connected between junction points 122 and 126. A diode 131 is connected between junction point 122 and power supply terminal 80, while junction point 126 is connected to power supply terminal 82. A conventional filter capacitor 134 is again connected between power supply terminals 80 and 82.

Figure 5:
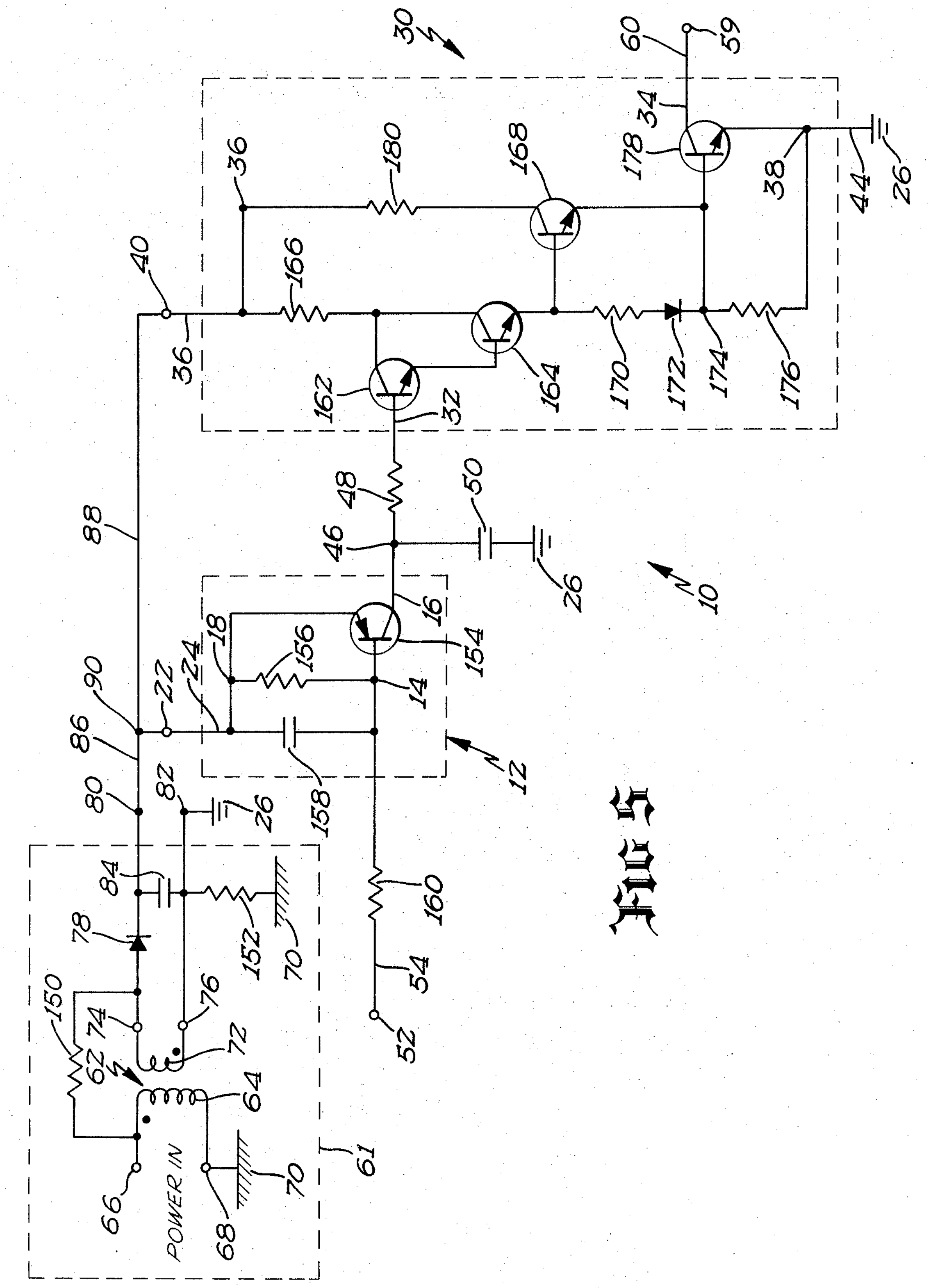
FIG. 5 shows a more detailed schematic of electronics which can be used with the electronic switch of the present invention shown in connection with a power supply operating from an alternating voltage input and also showing arrangements and configurations allowing enhancement of the reliability and increasing the noise immunity or noise suppression of the switch.

The embodiment of FIG. 5 is similar to the embodiment of FIG. 1 with the addition of the electronics disclosed within the dotted lines indicating amplifiers 12 and 30 and power supply 61.

In particular, power supply 61 of the D.C. coupled switching circuit 10 of FIG. 5 includes an enhancement resistor 150 connected between primary terminal 66 and secondary terminal 74 for purposes hereinafter explained. Further, an impedance in the form of resistor 152 is connected between power supply terminal 82 and earth ground 70 for purposes hereinafter explained.

Amplifier 12 includes a PNP transistor 154 having its emitter connected to power input 18 of amplifier 12, its collector connected to signal output 16 of amplifier 12, and its base connected to signal input 14 of amplifier 12. A resistor 156 is then connected between power input 18 and signal input 14 to utilize the leakage of transistor 154 in maintaining transistor 154 in a normally OFF condition. A capacitor 158 is connected in parallel with resistor 156 and is useful for increasing the noise immunity of the electronic switch of the present invention by providing an electrical bypass for high frequency voltage transients appearing at input 52 to electronic switching circuitry 10. That is, the value of capacitor 158 in association with the input resistance of transistor 54 tends to shunt or short high frequency signals to power supply 61, and from there to circuit ground 26, rather than allowing these signals to be amplified by amplifier 12. Thus, because of the use of power frequencies by the switch of the present invention, higher noise immunity can be had than prior switches operating at higher frequencies.

In FIG. 5, connection 54 is shown to include a high value resistor 160 useful in protecting the human touching touch plate 56 from the alternating voltage of circuitry 10 and further protecting the input of amplifier 12 from damage from excessive currents induced through touch plates 56 such as by a direct connection to a high voltage source or by static electricity from the human operator.

Amplifier 30 includes a Darlington arrangement of NPN transistors 162 and 164 having their common collectors connected to power input 36 of amplifier 30 through a current limiting resistor 166. The base of transistor 162 is connected to signal input 32 of amplifier 30, while the emitter of transistor 164 is connected to the base of a further NPN transistor 168 and to reference input 38 of amplifier 30 through a series connection of resistor 170, diode 172, junction point 174, and resistor 176.

The collector of transistor 168 is also connected to power input 36 through a further current limiting resistor 180.

Junction point 174 is also connected to the base of transistor 178 which has its collector connected to signal output 34 and its emitter connected to reference input 38.

The resistor 170, diode 172, and resistor 176 series arrangement provides bias to all of the transistors within amplifier 30. In particular, the series arrangement acts as the emitter resistor of Darlington pair 162 and 164.

Further, diode 172 aids in the initial conduction or "turn on" of transistor 168 in that it raises the potential at the emitter of transistor 164 with respect to the emitter of transistor 168 for a very small current through the emitter of transistor 164 to thus allow a smaller voltage at the emitter of transistor 164 to cause transistor 168 to conduct. Resistor 170 allows for small variances between diode 172 and the base emitter junction of transistor 168. Resistor 174 in addition to acting as a portion of the emitter resistor for transistor 164 provides bias to transistor 178 and allows any leakage current through transistor 178 to maintain it in an OFF or non conducting condition.

OPERATION

Basically the electrical switch of the present invention operates as follows: the electrical switching circuitry 10 is coupled, for example by transformer 62 to a source of alternating frequency power for causing the entire switching circuit to oscillate with respect to earth ground at the rate of the power input. The capacitance of the operator's finger in touching touch plate 56 then provides a reference between circuit 10 and earth ground which appears to switching circuit 10, which is isolated from earth ground, as an alternating frequency power input of an amplitude equal to the amplitude at which circuit 10 is oscillating with respect to earth ground. In other words, circuit 10 is modulated by its own oscillation with respect to earth ground. With this signal indicating the operator's touch of touch plate 56, circuit 10 provides a switched output, which may be a transition from an open circuit to a closed circuit, or if desired, a transition from a closed circuit to an open circuit. That is, the output of circuitry 10 has the effect of an electrical switch.

In particular, with respect to FIG. 1, power supply 61 is isolated from earth ground 70 by transformer 62. Therefore, it has been found that transformer 62 oscillates with respect to earth ground 70. It is to be noticed that this is normally a detrimental effect to be avoided, and thus in arriving at the present invention, prior art teachings need be avoided, and consideration given to effects against the teachings of the prior art.

Therefore, with the normally detrimental effect of transformer 2 and the remainder of power supply 61 oscillating 62 respect to earth ground 70, circuit ground 26 also oscillates with respect to earth ground 70, further a normally detrimental effect. Also, because of the oscillation of circuit ground 26 with respect to earth ground 70, from the frame of reference of circuit input 52 and viewing earth ground 70, an oscillatory voltage appears between earth ground 70 and circuit input 52. Therefore, it has been found that the operator's touch of plate 56 provides a capacitive coupling between touch plate 56, and thus circuit input 52, and earth ground 70 which causes the oscillatory signal to be applied to circuit input 52.

Assuming the worst case capacitance of a human to be 10 picofarads or less, at a 60 hertz power frequency, the capacitive reactance of the human touch is approximately 266 megohms. If it is assumed that circuit 10 is oscillating with respect to earth ground 70 at a voltage of approximately 10 volts, it can be seen that a current input to amplifier 12 of FIG. 1 is in the order of 20 nanoamperes. Amplification of currents in this order of magnitude is further contra to the thinking of those skilled in the art who are considered to believe currents in this range well into the range of noise currents and thus below the threshold of current which can be usefully amplified.

This extremely small 20 nanoampere input current is then amplified and rectified by amplifier 12, designed with a gain at least 10, and used to charge capacitor 50 connected to the output of amplifier 12.

Capacitor 50 is representative of various storage means possible according to the teachings of the present invention and is of a size capable of being easily fabricated by mass production techniques in small size. That is, in the embodiment of FIG. 1 capacitor 50 is on the order of 1,000 picofarads which may be currently fabricated by integration or thick film techniques so as to be mass produced in sizes on the order of a few thousands of an inch square.

Capacitor 50, once charged, approximates a current source for the high gain amplifier 30 through the high impedance path provided by the large value resistor 48. In the preferred embodiment of the switch as shown in FIG. 1, the value of resistor 48 is on the order of 10 megohms and the current gain for amplifier 30 is on the order of 10 to the sixth power or 10 to the seventh power. Resistor 48 may also be a voltage control resistance such as a field effect transistor, or may be incorporated within the input impedance of amplifier 30, such as a field effect transistor first stage.

The high value of resistor 48 is to assure that, along with sufficient gain in amplifiers 12 and 30, capacitor 50 is not sufficiently discharged as to allow ripple to appear at that switch output 59. That is, with the parameters given above, the placement of the operator's finger upon the touch plate 56 allows a rapid charging of capacitor 50 with the effect of changing the state of amplifier 30. If the gain of amplifier 12 is not sufficient to maintain capacitor 50 in a charged state, or if the value of resistor 48 with respect to the power frequency is not sufficiently large, or if the gain of amplifier 30 is not sufficient, the impedance output at output 59 may vary from the desired open circuit or closed circuit to an intermediate value which is not acceptable. That is, assuming the finger of an operator touching touch plate 56 renders the output impedance at output terminal 59 a short circuit, i.e., transistor 178 of FIG. 5 saturated, insufficient gain in amplifiers 12 or 30 or insufficient impedance in resistor 48 would allow the impedance from output terminal 59 to circuit ground 26 to rise from substantially zero ohms, i.e., transistor 178 in a conducting but unsaturated state, and constitute impedance which must be accounted for.

Now that the basic operation of the electronic switch of the present invention has been explained, the selection of the various parameters for proper operation can be appreciated. In the preferred embodiment, the first parameter selected is the value of the storage means 50, in this case the capacitance. As set out above, the value of the capacitance is selected for its ease of fabrication by mass production techniques.

Next, the operating supply voltages, i.e., the voltage, E, between supply terminals 80 and 82, is chosen.

Next, the output current requirements of the switch are selected. That is, the current to be flowing at output terminal 59 and thus to be switched by the electronic switch of the present invention should be known within the specific ranges.

Next, the gain for amplifier 30 may be calculated by multiplying the output current by the period of the alternating frequency power and dividing by the product of the supply voltage multiplied by the value of capacitor 50. That is, the expression may be set out as follows:

$$\text{Gain [Amplifier 30]} = IT/EC_{50}$$

Gains of between 10 to the seventh power and 10 to the second power have been used for $T$ equal to 20 milliseconds, $I$ equal to 150 milliamperes, $E$ equal to 5 volts, and $C_{50}$ equal to 1,000 picofarads.

Next, the value of resistance 48 may be calculated by dividing the time period of the alternating frequency power by the value of capacitor 50. This value, assuming sufficient gain in an amplifier 12, will prevent or avoid the complete discharge of capacitor 50.

Next, the gain of amplifier 12 is selected to assure that the 20 nanoampere input will charge capacitor 50 within the period of the alternating frequency power to thus provide a rapid turnon of the switch. The current output required for amplifier 12 is approximately the product of the supply voltage multiplied by the value of capacitor 50 and divided by the period of the alternating frequency power. That is, the expression is:

$$Io \text{ [Amplifier 12]} = EC_{50}/T$$

Gains of between 10 and 100 have been used for $E$ equal to 5 volts, $C_{50}$ equal to 1,000 picofarads, and $T$ equal to 20 milliseconds.

It has been found that if the gain of amplifier 12 is reduced and the gain of amplifier 30 is increased correspondingly, the circuit will also operate satisfactorily. Also, the converse has been found to apply. Thus, the gains of amplifier 12 between 10 and 10 to the third power have been found to correspond to gains of amplifier 30 of between 10 to the seventh power and 10 to the second power.

A subtle feature of the present invention may now be explained. The phasing of the alternating frequency power input with respect to the oscillation of circuit ground 26 must be considered under the following conditions. Assuming an induced voltage on the operator from the source of alternating frequency power, if the induced voltage is approximately equal in amplitude to the oscillatory amplitude of circuit ground 26, no signal is induced between circuit input 52 and earth ground 70. That is, the operator is oscillating simultaneously with circuit 10, and no modulation of circuit 10 occurs. This subtle defect can be used to advantage, as seen in FIG. 1. It is to be noted that transformer 62 is arranged such that the alternating frequency voltage appearing across secondary terminals 74 and 76 is 180 degrees out of phase from the alternating frequency voltage appearing between primary terminals 66 and 68. This is to be seen from the dot convention applied to transformer 62. Thus, by this technique, the oscillations of circuit ground 26 with respect to earth ground 70 may be such as to cause the entire switching circuit 10 to oscillate with respect to earth ground at the rate of the alternating frequency power in the opposite phase to that of the source of alternating frequency power to provide a more reliable switching by effectively doubling the signal input amplitude at terminal 52, assuming the same induced voltage upon the operator.

A further subtlety of the present invention may now be explained with respect to FIG. 3. It is to be noticed that resistor 102, which may as well be any impedance, is connected between power input terminal 104 and power supply terminal 80. Resistor 102 may be on the order of one megohm or larger, so as to substantially maintain the isolation of circuitry 10 yet provide sufficient connection as to cause circuitry 10 to oscillate at the full voltage input rather than a portion of the voltage input as would be true of the circuitry 10 of FIG. 1. This enhancement technique allows the induced voltage upon an operator to be substantially exceeded and may allow the induced voltage upon an operator to be disregarded entirely.

The impedance of resistor 102 may not be so large, however, as to significantly exceed the impedance of the operator between touch plate 56 and earth ground 70 or it cannot provide sufficient input current to circuitry 10. The enhancement impedance of resistor 102 may also be quite small in value if circuit 10 provides sufficient protection to an operator to prevent a direct connection to the power input. That is, resistor 102 may be a direct connection of no impedance if a detrimental connection between power terminal 104 and touch plate 56 can be avoided so as to electrically protect the operator.

FIG. 4 shows a further power supply which may be used for enhancement without the use of a transformer, such as in FIG. 1. The power supply of FIG. 4 is substantially a conventional power supply with the exception of the addition of resistor 124. While normally it is to be desired that circuit ground 26 be intimately connected with earth ground 70, resistor 124 is purposefully placed electrically between them for the purposes of the present invention, i.e., to cause rather than prevent the oscillation of circuit ground 26 with respect to earth ground 70. With resistors 120 and 124 of equal value, it can now be seen that power supply 61 will oscillate at approximately one-half of the peak value of the alternating frequency power supply voltage across terminals 104 and 106. With variations of the ratio of resistor 120 to 124, this value can be adjusted from a very low proportion of the input voltage amplitude to a very high proportion. Thus, the amplitude of oscillation of circuit 10 of the present invention can be quite directly controlled.

In FIG. 5, it can now be appreciated that resistor 150 is of the enhancement variety for purposes similar to those of resistor 102 of FIG. 3.

FIG. 5 includes a further subtlety in the increase of noise immunity of the electronic switch of the present invention. In particular, a large impedance, having a value substantially one megohm or greater, is connected between circuit ground 26 and earth ground 70, in the form of resistor 152. It has been found that such an impedance yet allows substantial oscillation of circuit 10 of the present invention while providing increased noise immunity. Further noise immunity is provided by capacitor 158 as explained hereinbefore.

It has further been found that if a zener diode is placed in parallel with capacitor 50 between junction point 46 and circuit ground 26 the supply voltage may be varied without also varying the parameters of circuit 10. Also, if conventional voltage division resistors are used in series with power supply 61, the value of voltage supplied may be varied without also varying the parameters of circuit 10.

Thus, a touch actuated electronic switch has been provided which can be easily integrated or adapted to other mass production techniques in that it includes no large capacitors, inductors, or other parts preventing such mass production. Further, the switch of the present invention requires no standby power as in other types of touch actuated switches.

Thus, since the invention disclosed herein may be embodied in other specific forms without departing from the spirit of general characteristics thereof, some of which forms have been indicated, the embodiment described herein is to be considered in all respects illustrative and not restrictive. The scope of the invention is indicated by the appended claims, rather than by the foregoing description, and all changes which come within the meaning and range of equivalency of the claims are intended to be embraced therein.

What is claimed is:

1. A D.C. coupled switching circuit actuated by the touch of a human, comprising in combination: means for supplying power to the D.C. coupled switching circuit including a first output for providing a reference isolated from earth ground and including a second output isolated from earth ground for providing a source of voltage; D.C. to power frequency amplification means having input means for receiving a signal to be amplified and having output means for providing a switch output, with the switched output having a first state for approximating an electrical short circuit and a second state for approximating an electrical open circuit, the amplification means being isolated from earth ground; first means for providing a D.C. electrical connection between the power supply means and the amplification means; means for coupling the switching circuit to a source of alternating frequency power for causing the entire switching circuit to oscillate with respect to earth ground at the rate of the alternating frequency; a touch plate isolated from earth ground; and means for providing a D.C. electrical connection between the input means of the amplification means and the touch plate to allow the capacitance of the human to provide an earth reference to the amplification means and cause the output of the amplification means to change between the first and second states.

2. A switching circuit actuated by the touch of the human, comprising in combination: a first amplifier including input means, output means, and a reference to circuit ground, the first amplifier being isolated from earth ground, being capable of amplifying power frequencies, and having a gain substantially betwen 10 and 10 to the third power; a second amplifier including input means and output means and a reference to circuit ground, the second amplifier being isolated from earth ground, being capable of amplifying power frequencies, and having a gain substantially between 10 to the seventh power and 10 to the second power; storage means of a size capable of being easily fabricated by mass production techniques in small size; means for connecting the storage means between the output means of the first amplifier means and circuit ground; impedance means of a value substantially one megohm or grater; and means for connecting impedance means between the output means of the first amplifier and the input means of the second amplifier.

3. A switching circuit actuated by the touch of a human, comprising in combination: means for supplying power to the switching circuit including a first output for providing a reference isolated from earth ground and including a second output isolated from earth ground for providing a source of voltage; power frequency amplification means having input means for receiving a signal to be amplified and having output means for providing a switched output, with the switched output having a first state for approximating an electrical short circuit and a second state for approximating an electrical open circuit, the amplification means being isolated from earth ground; first means for providing electrical connection between the power supply means and the amplification means; a touch plate isolated from earth ground; means for providing electrical connection between the input means of the amplification means and the touch plate to allow the capacitance of the human to provide an earth reference to the amplification means and cause the output of the amplification means to change between the first and second states; and means connected between a source of alternating frequency power and the switching circuit for causing a the entire switching circuit to oscillate with respect to earth ground at the rate of the alternating frequency and at an amplitude to provide more reliable actuation of the switching circuit.

4. A switching circuit actuated by the touch of a humn, comprising in combination; means for supplying power to the switching circuit including a first output for providing a reference isolated from earth ground and including a second output isolated from earth ground for providing a source of voltage; D.C. to power frequency amplification means having input means for receiving a signal to be amplified and having output means for providing a switched output, with the switched output having a first state for approximating an electrical short circuit and a second state for approximating an electrical open circuit, the amplification means being isolated from earth ground; first means for providing electrical connection between the power supply means and the amplification means; means for coupling the switching circuit to a source of alternating frequency power for causing the entire switching circuit to oscillate with respect to earth ground at the rate of the alternating frequency; a touch plate isolated from earth ground; means for providing electrical connection between the input means of the amplification means and the touch plate to allow the capacitance of the human to provide an earth reference to the amplification means and cause the output of the amplification means to change between the first and second states; means of having a value of impedance substantially one megohm or greater; and means for connecting the impedance means between the circuit reference and earth ground to increase the noise suppression capability of the switching circuit.

5. A switching circuit actuated by the touch of a human, comprising in combination: means, for accepting an alternating frequency power input and for providing a D.C. voltage output for supplying power to the switching circuit, including a first output isolated from earth ground for providing a reference and including a second output isolated from earth ground for providing a source of voltage; amplification means having input means for receiving a signal to be amplified and output means for providing a switched output, with the switched output having a first stage for approximating an electrical short circuit and a second state for approximating an electrical open circuit, the amplification means being isolated from earth ground; means for providing an electrical connection between the power supply means and the amplification means, with the connection of the power supply means causing the amplification means and the entire switching circuit to oscillate with respect to earth ground at the rate of the alternating frequency power in the opposite phase to that of the source of alternating frequency power to provide a more reliable actuation of the switching circuit; a touch plate isolated from earth ground; means for providing an electrical connection between the input means of the amplification means and the touch plate to allow the capacitance of the human to provide an earth reference to the amplification means and the remainder of the switching circuit to cause the output of the amplification means to change between the first and second states.

6. A touch actuated electronic switch, comprising, in combination: a surface accessible to an operator in a manner to allow electronic signal coupling between the surface and the operator; amplifier means isolated from earth ground including input means, output means, and means for accepting an alternating signal; means for providing an electrical connection between the surface and the input means of the isolated amplifier means; integrator means; and means for providing an electrical connection between the output means of the amplifier means and the integrator means.

7. The touch actuated electronic switch of claim 6, including a second amplifier means having input means and output means; and means for providing an electrical connection between the integrator means and the input means of the second amplifier means.

8. The touch actuated electronic switch of claim 6, wherein the means for accepting an alternating signal comprises power input terminals of the amplifier means.

9. A switching circuit actuated by the touch of a human, comprising in combination: means for supplying power to the switching circuit including a first output for providing a reference isolated from earth ground and including a second output isolated from earth ground for providing a source of voltage; power frequency amplification means having input means for receiving a signal to be amplified and having output means for providing a switched output, with the switched output having a first state for approximating an electrical short circuit and a second state for approximating an electrical open circuit, the amplification means being isolated from earth ground; first means for providing an electrical connection between the power supply means and the amplification means; means for coupling the switching circuit to a source of alternating frequency power for causing the entire switching circuit to oscillate with respect to earth ground at the rate of the alternating frequency; a touch plate isolated from earth ground; and means for providing an electrical connection between the input means of the amplification means and the touch plate to allow the capacitance of the human to provide an earth reference to the amplification means and cause the output of the amplification means to change between the first and second states.

10. The switching circuit of claim 9, wherein the first amplifier has a gain substantially between 10 and 10 to the third power; and including: a second amplifier including input means and output means and a reference, the second amplifier being isolated from earth ground, being capable of amplifying power frequencies, and having a gain substantially between 10 to the seventh power and 10 to the second power; storage means of a size capable of being easily fabricated by mass production techniques in small size; means for connecting the storage means between the output means of the first amplifier means and circuit reference; and means for providing an electrical connection between the output means of the first amplifier and the input means of the second amplifier.

11. The switching circuit of claim 10, wherein the means for coupling the switching circuit to a source of alternating frequency power comprises resistance means connected between a source of alternating frequency power and the switching circuit for causing the entire switching circuit to oscillate with respect to earth ground at the rate of the alternating frequency and at an amplitude to provide more reliable actuation of the switching circuit.

12. The switching circuit of claim 9, wherein the means for coupling the switching circuit to a source of alternating frequency power comprises resistance means connected between a source of alternating frequency power and the switching circuit for causing the entire switching circuit to oscillate with respect to earth ground at the rate of the alternating frequency and at an amplitude to provide more reliable actuation of the switching circuit.

13. The switching circuit of claim 12, including: means having a value of impedance substantially one megohm or greater; and means for connecting the impedance means between the circuit reference and earth ground to increase the noise suppression capability of the switching circuit.

14. The switching circuit of claim 9 including: means having a value of impedance substantially one megohm or greater; and means for connecting the impedance means between the circuit reference and earth ground to increase the noise suppression capability of the switching circuit.

15. The switching circuit of claim 9, wherein the means for coupling the switching circuit to a source of alternating frequency power comprises the means for providing an electrical connection between the power supply means and the amplification means.

16. The switching circuit of claim 15, wherein the means for coupling the switching circuit to a source of alternating frequency power causes the amplification means and the entire switching circuit to oscillate with respect to earth ground at the rate of the alternating frequency power and in the opposite phase to that of the source of alternating frequency power to provide a more reliable actuation of the switching circuit.

17. The switching circuit of claim 16, including: means having a value of impedance substantially one megohm or greater; and means for connecting the impedance means between the circuit reference and earth ground to increase the noise suppression capability of the switching circuit.

18. The switching circuit of claim 9, wherein the means for coupling the switching circuit to a source of alternating frequency power causes the amplification means and the entire switching circuit to oscillate with respect to earth ground at the rate of the alternating frequency power and in the opposite phase to that of the source of alternating frequency power to provide a more reliable actuation of the switching circuit.

* * * * *